Figure 1:
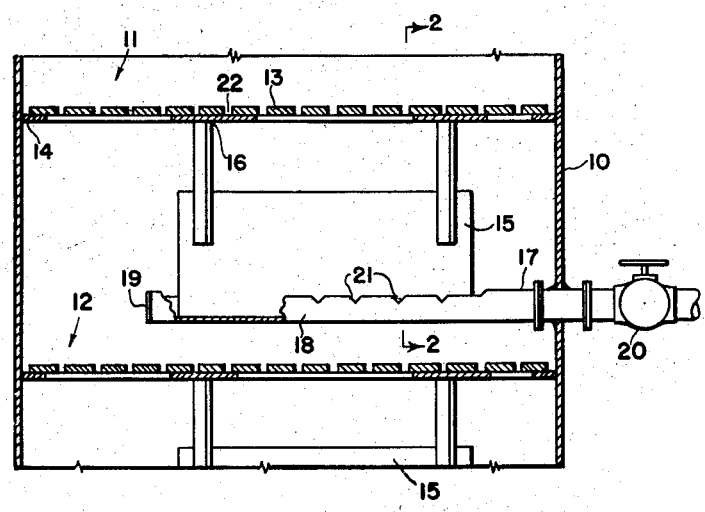

INVENTOR
FREDRIK JOHANNES ZUIDERWEG
BY *Oswald H. Milmore*
HIS ATTORNEY

United States Patent Office 2,882,030
Patented Apr. 14, 1959

2,882,030

CONTACTING COLUMN WITH SPRAY-CATCHING DEVICE

Frederik Johannes Zuiderweg, Amsterdam, Netherlands, assignor to Shell Development Company, New York, N.Y., a corporation of Delaware Application November 21, 1955, Serial No. 548,186

5 Claims. (Cl. 261—110)

The invention relates to gas-liquid contacting columns, e.g., fractional distillation columns, having a plurality of vertically spaced contacting trays provided with passages for the upflow of gas (the term "gas" being used generically to include vapor) to engage liquid accumulated on the tray and produce a liquid spray above the tray. More particularly, the invention is concerned with a spray-catching device for coalescing a portion of the liquid in said spray throughout an extended region thereof and collecting the coalesced liquid to permit such liquid to be lead to a desired point, e.g., to be withdrawn from the column.

It is often necessary to collect a portion of the liquid in a contacting column from points distributed over the tray area for any of various purposes, e.g., to withdraw a side stream from the column. For example, in the case of columns with trays wherein the liquid descends through a multitude of openings in the trays, e.g., grid trays and perforated trays, it is not feasible to draw off liquid directly from one or a few points on the tray itself because the liquid would no longer be distributed uniformly over the tray, and by-passing of gas at regions of relatively lower liquid head and downflow of liquid at regions of relatively greater liquid head would result. Special liquid-collecting arrangements which have heretofore been applied, including liquid-collecting basins mounted between trays and special trays portions of which were formed as basins (see U.S. Patent 2,682,394), occupy a significant part of the tray available for useful gas-liquid contacting and encroach upon the spray space between trays, wherein the useful contacting between the gas and liquid occurs.

It is an object of this invention to provide an improved device for collecting a part of the liquid spray over an extended part of the tray area, the device being such that it does not significantly reduce the space available for gas-liquid contacting and which interferes only to a negligible extent with the spray action.

In summary, the spray-catching device according to the invention comprises an upright spray-catching wall mounted in the inter-tray space and forming a baffle for coalescing a part of the liquid spray, and a conduit having an inlet, e.g., an open trough, disposed to receive coalesced liquid which flows down along the baffle. One or more of such devices can be mounted in each inter-tray space from which it is desired to remove liquid, a larger number being used for columns of larger diameters.

Figure 2:
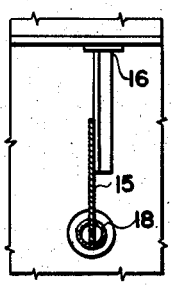

The invention will be further described with reference to the accompanying drawing forming a part of this specification and showing one preferred embodiment, wherein:

Figure 1 is a vertical sectional view through a portion of a contacting column equipped with the improved spray-catching device; and Figure 2 is a fragmentary sectional view, taken on the line 2—2 of Figure 1.

Referring to the drawing in detail, 10 represents the intermediate portion of the enclosing wall of a fractional distillation column provided with suitable means for supplying liquid reflux at the top and vapor at the bottom, for withdrawing vapor or condensate at the top and liquid at the bottom, and for admitting the feed at a suitable level; these means, being well known in the art, are not shown. The column contains a plurality of horizontal, vertically spaced contacting trays, such as the grid trays shown at 11 and 12. Each grid tray extends over the full cross sectional area of the column and is formed of a plurality of parallel, horizontal bars 13 supported on a ring 14 which is welded to the column. The bars thus provide intervening slots 22 which advantageously have the same narrow widths throughout the area of any one tray. The bars and slots may, for example, have the relative dimensions and the trays may have the vertical spacing described in the aforesaid U.S. Patent 2,682,394.

The spray-catching device comprises an upright, preferably thin and vertical, spray-catching baffle wall 15 suitably mounted in the inter-tray space, e.g., by a pair of structural angles 16 fixed to the bottom of the next higher tray. A liquid draw-off pipe 17 passes out through the column wall 10 and has a horizontal inlet portion 18 shaped as an open trough with a part on each side of the baffle wall to form a pair of gutters. The end of the trough remote from the pipe 17 is closed by an end wall 19. The rate of liquid withdrawal can be controlled by a flow control valve 20. Serrations 21 may optionally be provided along the edges of the trough at a common level.

The top edges of the open trough are typically within 4 to 8 inches above the subadjacent tray 12. The baffle wall 15 advantageously has a height above the gutter which is equal to at least one-third of the height of the inter-tray space; usually baffles of greater heights, e.g., one-half to three-fourths of the height of the inter-tray space are used. The baffle preferably has a length that is sufficient to engage liquid spray over an appreciable horizontal distance, so as not to disturb the liquid distribution on the tray to a detrimental extent. Thus, if a single baffle wall is used it preferably has a length equal to one-third to three-fourths the width of the tray, measured in the plane of the baffle wall. However, shorter walls may be used if a plurality of such walls are used. Any suitable number of such devices are, of course, mounted side by side as required to effect distributed withdrawal of liquid. The baffle wall or walls do not, however, in the preferred arrangement, extend from wall to wall, whereby partitioning of the inter-tray space is avoided. While inclined baffles can be used, it is preferred to use vertical baffles, as shown, to minimize the lateral dimension of the vertical projection of the catching device onto a horizontal plane and thereby to present the smallest possible obstruction to the upward travel of the liquid spray. For the same reason the width of the trough 18 is kept small.

In operation, liquid falling on each tray is prevented from draining freely through the slots 22 by the upflow of gas, and a body of liquid is, therefore, accumulated on each tray. This liquid flows through the slots, usually intermittently and in alternation with gas, at a total flow rate essentially equal to the rate of supply from the next higher tray. Since in the column shown there are no liquid downcomers, the liquid passes down distributed over the tray area. More or less uniform distribution of liquid is important for efficient operation of the tray. The ascending gas engages the accumulated liquid to throw up a liquid spray or foam into the inter-tray spacese. (The term "spray" is used herein to denote generically any such liquid and gas bed formed by the gas and including liquid that is disrupted to expose a large liquid surface.) The liquid spray is disengaged by gravity from the gas in the free space above the tray and falls again onto the tray, where part of it is again engaged by gas. Because of turbulence the spray moves with a lateral velocity component, so that it strikes the two sides of the baffle wall 15, both on the ascent and descent. A part of the spray is thereby coalesced and runs down along the baffle wall into the open trough 18, from which it flows into the draw-off pipe 17 at a rate determined by the valve 20. This coalesced liquid, being shielded by the bottom of the trough from the gas currents, has a density that approaches the density of pure liquid.

Because the baffle wall 15 coalesces liquid over an extended region of the inter-tray space, the distribution of liquid on the tray is not detrimentally affected. By making the top edge of the trough 18 horizontal, any coalesced liquid collected therein in amount in excess of that withdrawn through the valve 20 simply overflows along the length of the trough. The serrations 21 aid in causing overflow of liquid at points distributed along the length of the trough.

While the invention has been illustrated in connection with a grid tray column, it is evident that the invention is not limited to use in connection with such trays, but is particularly useful also with punched or slotted plate trays and sieve trays. They can also be used on trays having downcomers and/or on bubble cap trays.

I claim as my invention:

1. In combination with a gas-liquid contacting column wherein trays are arranged in vertically spaced relation, each said tray having passages for the upflow of gas to engage liquid that accumulates on the tray and thereby to form a spray and for the downflow of accumulated liquid through the tray at a multitude of points distributed over the tray area: a liquid draw-off device comprising an upright spray-catching baffle which is mounted in an inter-tray space and provides a lateral coalescing surface extending adjacent the said spray so as to be directly impinged by liquid ascending from the tray over an interior tray region, a liquid collector extending along the bottom of the baffle in liquid-receiving relation to said coalescing surface, the major part of said coalescing surface being situated above said collector so as to leave said part of the coalescing surface laterally exposed and unobstructed by the collector, and a draw-off pipe which has an inlet disposed to receive coalesced liquid from said collector, said draw-off device occupying only a minor fraction of the cross sectional area of the inter-tray space and leaving said space substantially open over at least one extended area adjoining the said coalescing surface for the unimpeded up-and-down passage of said spray.

2. The combination according to claim 1 wherein said baffle is a substantially vertical wall having a height in excess of one-third the height of said inter-tray space and said collector is a trough extending along the bottom of the wall in vertically spaced relation above the subadjacent tray.

3. The combination according to claim 1 wherein said pipe extends out of the column for withdrawing said coalesced liquid, said pipe conduit having valve means for controlling the rate of liquid withdrawal.

4. The combination according to claim 3 wherein said collector is an open trough having serrations along the upper edge thereof at a common level for the overflow of collected liquid.

5. In combination with a gas-liquid contacting column including horizontal trays arranged in vertically spaced relation and extending fully across the column, said trays having passages distributed over the tray areas for the upflow of gas to engage liquid that accumulates on the trays and for the downflow of accumulated liquid at a multitude of points, said openings constituting the sole passageways for the downflow of liquid between trays: a liquid draw-off device comprising a vertical spray-catching baffle which is mounted in an inter-tray space and extends over the major part of the interior region of a tray and vertically through a distance in excess of one-third of the height of said inter-tray space, a gutter on each side of said baffle situated in spaced relation above the subadjacent tray and in liquid-receiving relation to a lower part of said baffle, and a draw-off conduit passing out through the wall of said column and connected to receive liquid from said gutters for withdrawing said coalesced liquid from the column, said gutter being narrow end occupying only a minor fraction of the cross sectional area of the inter-tray space and said device leaving said space substantially open over at least one extended area adjoining the baffle for the unimpeded up-and-down passage of said spray.

References Cited in the file of this patent

UNITED STATES PATENTS

| | | |
|---|---|---|
| 1,399,037 | Uhde | Dec. 6, 1921 |
| 1,443,974 | Burhorn | Feb. 6, 1923 |
| 1,748,508 | Cooke | Feb. 25, 1930 |
| 2,007,759 | Harmon | July 9, 1935 |
| 2,538,957 | Askevold et al. | Jan. 23, 1951 |
| 2,573,491 | Richardson | Oct. 30, 1951 |
| 2,682,394 | Guthrie et al. | June 29, 1954 |
| 2,711,308 | Cogan | June 21, 1955 |
| 2,725,343 | Lambert | Nov. 29, 1955 |
| 2,764,535 | Tyskewicz | Sept. 25, 1956 |

FOREIGN PATENTS

| | | |
|---|---|---|
| 618,029 | Great Britain | Feb. 15, 1949 |